Aug. 17, 1926. 1,596,389

A. J. BARNHART

CULTIVATOR SHANK

Filed March 18, 1925

Inventor:
Andrew J. Barnhart
By Hazard and Miller
Attorneys.

Witness

Patented Aug. 17, 1926.

1,596,389

UNITED STATES PATENT OFFICE.

ANDREW J. BARNHART, OF PLACENTIA, CALIFORNIA.

CULTIVATOR SHANK.

Application filed March 18, 1925. Serial No. 16,479.

This invention is an improvement upon the tractor cultivator disclosed in my prior Patent No. 1,484,318 issued February 19, 1924.

The object of this invention is to provide an improved cultivator shovel or plow which is primarily adapted to be employed upon the tractor cultivator disclosed in my prior patent, although it will be understood that the improved plow or shovel may be equally well employed upon other cultivators.

With the foregoing and other objects in view which will be made manifest in the following detailed description and specifically pointed out in the appended claims, reference is had to the accompanying drawing for an illustrative embodiment of the invention, wherein:

Figure 1:
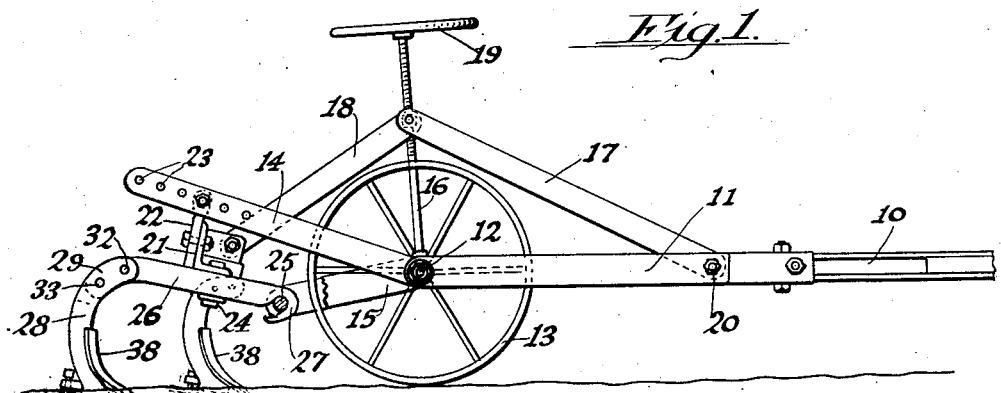
Figure 1 is a side elevation of the cultivator disclosed in my prior patent to which the improved plow or shovel has been applied.

Referring to the accompanying drawing wherein similar reference characters designate similar parts throughout, the cultivator shown and which is the subject matter of my prior patent consists generally of a drawbar 10 provided with braces or diagonal members 11 extending rearwardly from the drawbar and having their rearward ends secured to a rod 12. Ground wheels 13 are rotatable upon the rod 12 and members 14 and 15 are pivoted upon the rod 12. A jack screw 16 is pivoted upon the rod 12 for swinging as well as rotary movement, and is provided with a block threaded thereon to which links 17 and 18 are pivotally secured. The jack screw 16 at its upper end is provided with a hand wheel 19. The forward ends of the links 17 are pivoted as at 20 between the braces or diagonal members 11. Transverse members 21 extend transversely across the cultivator behind the ground wheels 13 and carry brackets 22 which may be secured to the members 14 in any of the apertures 23 formed therein. The rearward ends of the links 18 are pivotally secured to the transverse member 21.

The transverse member 21 carries clamps 24 between which are clamped the attaching members or attaching parts of the cultivator plows or shovels. The rearward ends of the members 15 carry a rod 25 over which the hooked ends of the attaching members of the plows or shovels are adapted to be placed. It will be understood that by shifting the transverse member 21 backwardly or forwardly upon the attaching members of the plows by fastening the brackets 22 in the desired apertures 23, the depth at which the plows pass through the ground may be varied. A finer adjustment of the depth of the plows or shovels is obtained by rotating the jack screw 16 by means of the hand wheel 19.

The specific plow or shovel which constitutes the feature of this invention consists of an attaching member 26 having the hooked end 27 adapted to be placed over the rod 25. The body of the attaching member 26 is adapted to be clamped between the clamps 24 upon the transverse member 21. The shank of the plow is designated at 28 and is preferably U-shaped or channel-shaped in horizontal section so as to reduce the amount of metal in making the shank and also to preserve the strength of the shank. Adjacent the upper end of the shank 28 there are two arms 29 which are adapted to be disposed upon opposite sides of the end of the attaching member 26. Two holes 30 and 31 respectively are formed in the arms 29 and also in the attaching member 26. The hole 30 is adapted to receive a metal pin 32 providing a pivotal connection between the shank 28 and the attaching member 26. The hole 31 is adapted to receive a breakable pin 33 which may be formed of a hard wood, such as hickory, maple or the like. Adjacent the lower end of the shank 28 there is formed an enlargement or box 34 having an aperture 35 formed therein. A blade 36 extends through the aperture 35 so as to project forwardly of the shank 28. This blade is removably secured or clamped within the aperture 35 as by a set screw 37. A guard 38 has one end secured upon the forward side of the shank 28 as by rivets 39. The lower end of the guard 38 is bent forwardly and engages the top of the blade 36 adjacent its forward end.

Several features of the improved cultivator plow or shovel are to be noted. By means of the pivot forming pin 32 and the breakable pin 33, if the plow engages a stump, root, stone, or other construction, the cultivator will not be broken, nor will the tractor drawing the cultivator be stalled, as when such engagement creates distress upon the shank 38, the breakable pin 33 will be sheared off, so that the plow or shovel may swing backwardly upon the pivot pin 32. It will also be noted that the angle of the blade 36 approaches the horizontal, and usually the inclination of the blade 36 is not greater than 30 deg. with the horizontal. By such arrangement the blade 36 moves beneath the surface of the ground in an approximately horizontal position. The result is that the soil which is engaged and moved by the improved plow will not tend to turn over. The object of this construction is to keep the soil which is upon the top or surface of the ground uppermost after having been moved by the plow. It will be appreciated that the top soil becomes dried out whereas the soil beneath it contains considerable quantities of moisture. The improved plow is so designed so as to move the soil or lift it to admit the air beneath it, but at the same time it will not turn over the soil, exposing the moist earth which originally was beneath the surface. In this manner the moisture is preserved in the soil and irrigation is unnecessary. The guard 38 because of its position cooperates with the blade 36 in lifting the soil, but at the same time it will not tend to turn over the soil. The result of moving or lifting the soil without turning it over develops mainly because of the position or inclination of the blade 36 and the fact that the shank 28 is approximately upright and also because of the construction of the guard 38.

Figure 2:
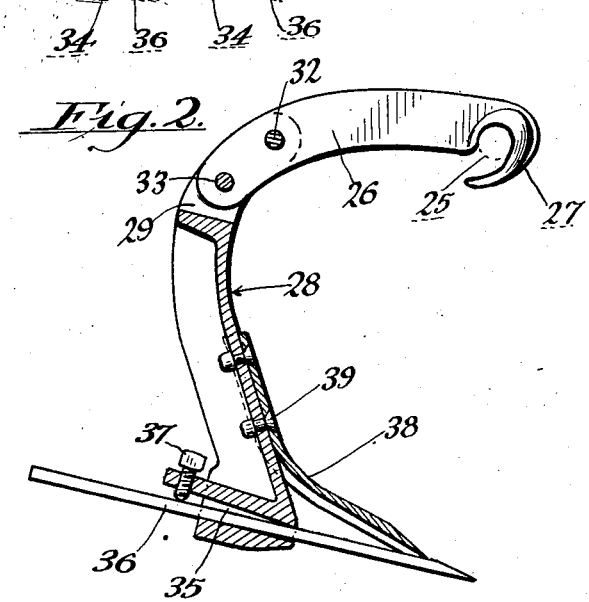
Fig. 2 is a vertical section through the improved cultivator plow or shovel, and may be considered as taken upon the line 2—2 of Fig. 3.
Figure 3:
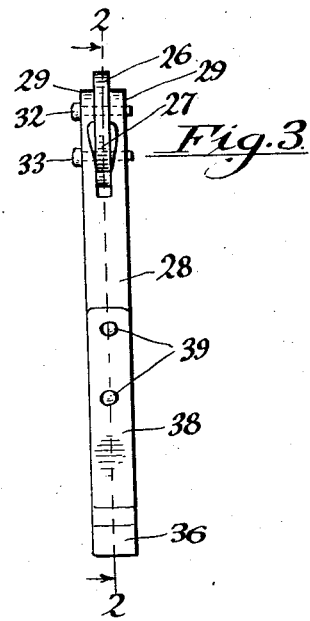
Fig. 3 is a front elevation of the same.
Figure 4:
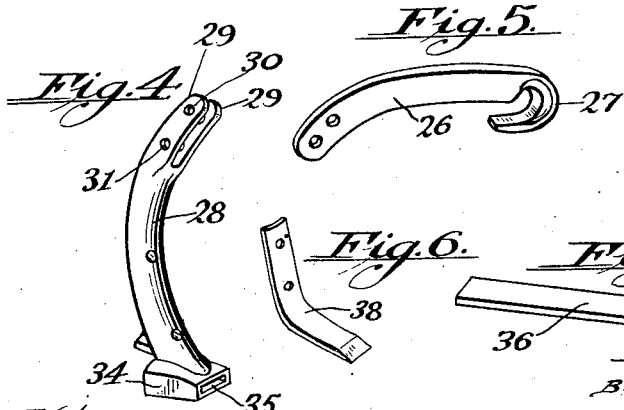
Fig. 4 is a perspective view of the shank forming the plow.
Figure 5:
Fig. 5 is a perspective view of the attaching member.
Figures 6, 7:
Fig. 6 is a perspective view of the guard which is mounted upon the shank.
Fig. 7 is a perspective view of the blade of the plow or shovel.

In the course of time the edge of the blade 36 wears off and the under side of the forward end of the blade 36 becomes worn upon an approximately horizontal surface. When the blades have become so worn, the set screw 37 can be loosened and the blade can be withdrawn from the aperture 35 and turned over, thus presenting a new sharp cutting edge having an upwardly beveled surface as shown in Fig. 2.

From the above it will be appreciated that an improved cultivator plow or shovel is provided, which accomplishes new and beneficial results and which may be easily and quickly manufactured and applied to a cultivator. The attaching member 26 may be changed in any suitable manner for attachment to any type of cultivator desirable.

It will be understood that various changes in the detail of construction may be made without departing from the spirit or scope of the invention as defined by the appended claims.

I claim:

1. A cultivator plow or shovel comprising a shank, channel-shaped in cross section, having its lower end provided with a tubular enlargement, a blade disposed within said enlargement in a downwardly and forwardly inclined position therein, a set screw threaded into the top of the enlargement behind the shank for holding the blade within the enlargement, and a guard of substantially the same width as the shank secured to the forward side of the shank and bearing upon the top of the blade.

2. A cultivator plow or shovel comprising a shank channel-shaped in cross section, said shank having an aperture formed therethrough adjacent its lower end, a blade disposed in said aperture and extending forwardly from the shank, a set screw carried by the shank engageable upon said blade, and a guard having its upper end secured against the forward side of the shank and having its other end extending downwardly and forwardly in spaced relation to the bottom of the shank, the lower end of the guard bearing on top of the blade adjacent its forward end.

3. A cultivator plow or shovel comprising a shank channel-shaped in cross section, said shank having an aperture formed therethrough adjacent its lower end, a blade disposed in said aperture and extending forwardly from the shank, a set screw carried by the shank engageable upon said blade, and a guard having its upper end secured against the forward side of the shank and having its other end extending downwardly and forwardly in spaced relation to the bottom of the shank, the lower end of the guard bearing on top of the blade adjacent its forward end, said shank being provided with two arms, an attaching member having one end positioned between the two arms, and pins extending through the arms and attaching member, said attaching member being provided on its forward end with a rearwardly curved hook.

4. A cultivator plow or shovel comprising a shank having an aperture formed in its lower end, a blade disposed within said aperture and extending downwardly and forwardly therefrom, a set screw for holding said blade in said aperture, and a guard secured to the forward side of said shank and bearing upon the top of said blade, said blade and guard being in width approximately equal to the width of the shank.

In testimony whereof I have signed my name to this specification.

ANDREW J. BARNHART.